(12) United States Patent
Tateishi et al.

(10) Patent No.: US 11,445,785 B2
(45) Date of Patent: Sep. 20, 2022

(54) SHOE SOLE MEMBER AND SHOE

(71) Applicant: ASICS CORPORATION, Kobe (JP)

(72) Inventors: Junichiro Tateishi, Kobe (JP); Takashi Yamade, Kobe (JP); Daisuke Sawada, Kobe (JP); Takashi Osaki, Kobe (JP); Kenichi Harano, Kobe (JP)

(73) Assignee: ASICS CORPORATION, Kobe (JP)

( * ) Notice: Subject to any disclaimer, the term of this patent is extended or adjusted under 35 U.S.C. 154(b) by 276 days.

(21) Appl. No.: 16/754,738

(22) PCT Filed: Oct. 13, 2017

(86) PCT No.: PCT/JP2017/037236
§ 371 (c)(1),
(2) Date: Apr. 8, 2020

(87) PCT Pub. No.: WO2019/073607
PCT Pub. Date: Apr. 18, 2019

(65) Prior Publication Data
US 2020/0305547 A1  Oct. 1, 2020

(51) Int. Cl.
| | | |
|---|---|---|
| A43B 13/02 | (2022.01) | |
| A43B 13/04 | (2006.01) | |
| C08J 9/236 | (2006.01) | |
| A43B 13/18 | (2006.01) | |
| A43B 13/22 | (2006.01) | |
| C08J 9/32 | (2006.01) | |

(52) U.S. Cl.
CPC ............ *A43B 13/187* (2013.01); *A43B 13/02* (2013.01); *A43B 13/04* (2013.01); *A43B 13/22* (2013.01); *C08J 9/32* (2013.01)

(58) Field of Classification Search
CPC ......... A43B 13/87; A43B 13/02; A43B 13/04; A43B 13/22; A43B 13/026; A43B 13/188; C08J 9/32; B29D 35/0054; B29D 35/122
See application file for complete search history.

(56) References Cited

U.S. PATENT DOCUMENTS

| | | |
|---|---|---|
| 5,833,320 A | 11/1998 | Kaneko et al. |
| 9,781,974 B2 | 10/2017 | Reinhardt et al. |
| 9,788,598 B2 | 10/2017 | Reinhardt et al. |

(Continued)

FOREIGN PATENT DOCUMENTS

| | | |
|---|---|---|
| CN | 101583656 A | 11/2009 |
| CN | 105121528 A | 12/2015 |

(Continued)

OTHER PUBLICATIONS

An Office Action mailed by China National Intellectual Property Administration dated Mar. 3, 2021, which corresponds to Chinese Patent Application No. 201780095681.6 and is related to U.S. Appl. No. 16/754,738; with English language translation.

(Continued)

*Primary Examiner* — Kara B Boyle
(74) *Attorney, Agent, or Firm* — Studebaker & Brackett PC (57) ABSTRACT

Provided is a shoe sole member partially or entirely formed of a resin composite, the resin composite including; a non-foamed elastic body matrix composed of an elastomer; and a plurality of resin foam particles dispersed in the elastic body matrix. Also provided is a shoe including the shoe sole member.

14 Claims, 3 Drawing Sheets

(56) References Cited

U.S. PATENT DOCUMENTS

| | | | |
|---|---|---|---|
| 9,788,606 | B2 | 10/2017 | Reinhardt et al. |
| 9,795,186 | B2 | 10/2017 | Reinhardt et al. |
| 9,820,528 | B2 | 11/2017 | Reinhardt et al. |
| 9,930,928 | B2 | 4/2018 | Whiteman et al. |
| 2005/0027025 | A1* | 2/2005 | Erb .................. A43B 17/003 521/50 |
| 2010/0047550 | A1 | 2/2010 | Prissok et al. |
| 2012/0328889 | A1 | 12/2012 | Hayashi et al. |
| 2013/0291409 | A1 | 11/2013 | Reinhardt et al. |
| 2014/0151918 | A1 | 6/2014 | Hartmann |
| 2014/0223777 | A1 | 8/2014 | Whiteman et al. |
| 2014/0259329 | A1 | 9/2014 | Watkins et al. |
| 2014/0366403 | A1 | 12/2014 | Reinhardt et al. |
| 2014/0366404 | A1 | 12/2014 | Reinhardt et al. |
| 2014/0366405 | A1 | 12/2014 | Reinhardt et al. |
| 2015/0252163 | A1* | 9/2015 | Prissok .................. A43B 13/00 521/174 |
| 2016/0128426 | A1 | 5/2016 | Reinhardt et al. |
| 2018/0035755 | A1 | 2/2018 | Reinhardt et al. |
| 2018/0206591 | A1 | 7/2018 | Whiteman et al. |
| 2018/0208733 | A1* | 7/2018 | Tayagaki .................. C08L 9/02 |
| 2018/0368515 | A1* | 12/2018 | Yamade .................. A43B 13/04 |
| 2019/0037969 | A1 | 2/2019 | Busbee et al. |

FOREIGN PATENT DOCUMENTS

| | | |
|---|---|---|
| CN | 108289528 A | 7/2018 |
| JP | H08-38211 A | 2/1996 |
| JP | H08-197651 A | 8/1996 |
| JP | H09-206102 A | 8/1997 |
| JP | 2001-002814 A | 1/2001 |
| JP | 4154502 B2 | 9/2008 |
| JP | 2010-037408 A | 2/2010 |
| JP | 2013-220354 A | 10/2013 |
| JP | 2014-151210 A | 8/2014 |
| JP | 2014-521418 A | 8/2014 |
| JP | 6116787 B1 | 4/2017 |
| KR | 200342160 Y1 | 2/2004 |
| WO | 2017/014064 A1 | 1/2017 |
| WO | 2017/094131 A1 | 6/2017 |

OTHER PUBLICATIONS

International Search Report issued in PCT/JP2017/037236; dated Dec. 26, 2017.
Notification of Transmittal of Translation of the International Preliminary Report on Patentability and Translation of Written Opinion of the International Searching Authority; PCT/JP2017/037236; dated Apr. 23, 2020.
The extended European search report issued by the European Patent Office dated Jun. 26, 2020, which corresponds to European Patent Application No. 17928751.1-1011 and is related to U.S. Appl. No. 16/754,738.
An Office Action mailed by China National Intellectual Property Administration dated Aug. 6, 2021, which corresponds to Chinese Patent Application No. 201780095681.6 and is related to U.S. Appl. No. 16/754,738; with English language translation.
An Office Action mailed by China National Intellectual Property Administration dated Dec. 27, 2021, which corresponds to Chinese Patent Application No. 201780095681.6 and is related to U.S. Appl. No. 16/754,738; with English language translation.

* cited by examiner

SHOE SOLE MEMBER AND SHOE

FIELD

The present invention relates to a shoe sole member and a shoe, and more specifically, to a shoe sole member that is partially or entirely formed of a resin composite having a plurality of resin foam particles dispersed therein, and a shoe including the shoe member.

BACKGROUND

Shoe sole members are required to have excellent cushioning performance. Generally, a foam product is used as a material for the shoe sole members that satisfy such requirements. For example, Patent Literatures 1 to 3 disclose shoe sole members composed of a foam product formed by welding a plurality of foam particles.

In the shoe sole member using such a foam product, the cushioning properties of the shoe sole member can be effectively enhanced by increasing the expansion ratio of the foam product. Further, due to the low initial stiffness of the foam product of a high expansion ratio, a shoe including such a foam product as the shoe sole member has soft and comfortable wearing feeling when the foot fits in the shoe.

However, when the shoe sole member for which such a conventional foam product is used is continuously subjected to high load by use, the shape restoring force of the foam product deformed due to the load is likely to decrease. This causes a problem that cushioning properties and durability of the shoe sole member are likely to decrease. Especially, in sports shoes such as basketball shoes and running shoes, of which the shoe soles are liable to be subjected to a high load, the load tends to concentrate in certain areas of the shoe sole member, in which the restoring force is likely to decrease.

Shoes that include a foam product of a high expansion ratio as the shoe sole member as described above are greatly deformed when subjected to a load, and may therefore be excessively deformed when subjected to a high load. In this case, there are problems that the deformation greatly impairs agility and causes a large strain on the foot of a wearer. Thus, the abovementioned sports shoes are required to include a shoe sole member having a relatively small amount of strain (amount of deformation) when subjected to a high load.

On the other hand, as disclosed in Patent Literature 4, an elastomer is also used as another material for a shoe sole member having cushioning performance. Since an elastomer has a smaller amount of strain and is more excellent in elastic recovery than a foam product when subjected to a high load, the shoe sole member for which such an elastomer is used is excellent in durability while exhibiting cushioning properties.

However, there is a problem that the shoe sole member for which an elastomer is used has lower cushioning properties than the shoe sole member composed of the aforementioned foam product during normal use when not subjected to a high load. Further, since the elastomer has relatively high stiffness, it has a problem of causing hard wearing feeling when the foot fits into the shoe.

CITATION LIST

Patent Literature

Patent Literature 1: JP 2014-521418 T
Patent Literature 2: JP 2013-220354 A
Patent Literature 3: JP 2014-151210 A
Patent Literature 4: JP 1109-206102 A

SUMMARY

Technical Problem

In view of the abovementioned problems, it is an object of the present invention to provide a shoe sole member that exhibits soft wearing feeling when the foot fits in the shoe provided with the shoe sole member, that can suppress excessive deformation while having sufficient lightweight properties, and that can exhibit high cushioning properties and durability when provided in the shoe, and a shoe including such a shoe sole member.

Solution to Problem

The present inventors have found that the above problems can be solved by using a resin composite in which a plurality of resin foam particles are dispersed in a non-foamed elastic body composed of an elastomer as a matrix.

That is, the shoe sole member according to the present invention is partially or entirely formed of a resin composite, the resin composite including: a non-foamed elastic body matrix composed of an elastomer; and a plurality of resin foam particles dispersed in the elastic body matrix.

In the shoe sole member according to the present invention, for example, the elastomer includes a thermoplastic resin.

In the shoe sole member according to the present invention, for example, the elastomer includes a thermosetting resin.

In the shoe sole member according to the present invention, it is preferable that the elastomer include a polyolefin-based elastomer or a polystyrene-based elastomer, and that the plurality of foamed resins resin foam particles be constituted by a resin composition including a polyolefin-based resin.

In the shoe sole member according to the present invention, it is preferable that the elastomer include a polyurethane-based elastomer, and that the plurality of resin foam particles be constituted by a resin composition including a polyurethane-based resin.

In the shoe sole member according to the present invention, it is preferable that the elastic body matrix have an initial elastic modulus at 23° C. being smaller than an initial elastic modulus at 23° C. of the plurality of resin foam particles.

In the shoe sole member according to the present invention, it is preferable that the elastic body matrix and the plurality of resin foam particles adhere to each other via a binder.

A shoe according to the present invention includes the abovementioned resin composition.

DESCRIPTION OF EMBODIMENTS

Hereinafter, an embodiment of a shoe sole member and a shoe of the present invention will be described with reference to the drawings. The following embodiments are shown merely as examples. The present invention is not limited to the following embodiment at all.

Figure 1:
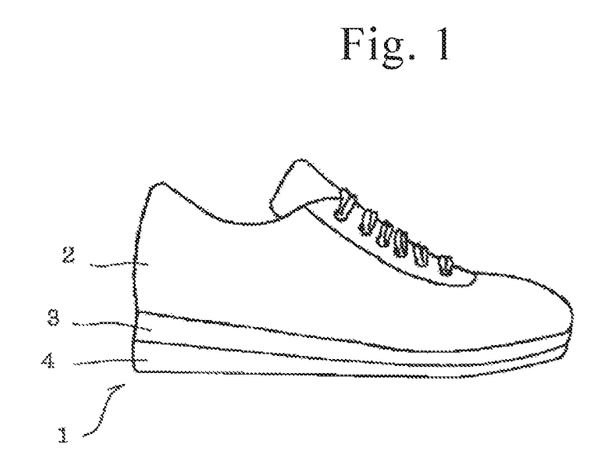
FIG. 1 is a schematic view showing a shoe in which a shoe sole member of one embodiment is used.

FIG. 1 shows a shoe 1 provided with a shoe sole member of this embodiment as a midsole. The shoe 1 includes an upper member 2 covering an upper side of a foot, and shoe sole members 3 and 4 disposed on a lower side of the upper member 2 to form a shoe sole. The shoe 1 includes, as the shoe sole members, an outer sole 4 disposed at a position to engage with the ground, and a midsole 3 disposed between the upper member 2 and the outer sole 4.

Figure 2:
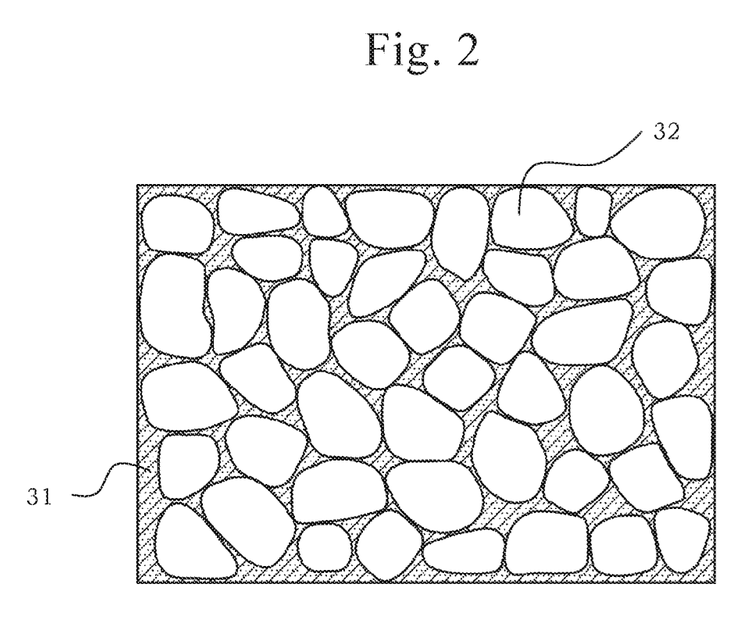
FIG. 2 is a schematic cross-sectional view of a shoe sole member (midsole) of the one embodiment.

FIG. 2 is a schematic cross-sectional view of the midsole 3, which is the shoe sole member of this embodiment. As shown in FIG. 2, the midsole 3, which is the shoe sole member of this embodiment, is formed of a resin composite including: a non-foamed elastic body matrix 31 composed of an elastomer; and a plurality of resin foam particles 32 dispersed in the elastic body matrix 31. With such a configuration, the midsole 3 has a relatively small initial stiffness, a relatively large amount of strain during normal use and a relatively small amount of strain at a high load, is sufficiently light in weight as a shoe sole member, and has a relatively high elastic recovery. The shoe including the shoe sole member accordingly exhibits soft wearing feeling when the foot fits in the shoe, can suppress excessive deformation while having sufficient lightweight properties, can exhibit high cushioning properties, and is excellent in durability. Here, the high-load state of the shoe sole member means the state where it is subjected to stress of approximately 0.6 to 1.0 MPa.

In the resin composite of the present invention, the state where the plurality of resin foam particles are dispersed in the elastic body matrix refers to the state where substantially all of the plurality of resin foam particles included in the resin composite are independently distributed in the elastic body matrix without being welded to each other (that is, distributed in the elastic body matrix so that less than 10% in the number of the plurality of resin foam particles included in the resin composite are welded to each other). That is, it refers to the state where the substantially all of the plurality of resin foam particles have the surfaces on which the elastic body matrix is present. The abovementioned dispersion state in the midsole 3 can be checked as follows. First, the midsole 3 is cut in its thickness direction to observe the cross-sectional surface. Among the resin foam particles exposed to the cross-sectional surface, the percentage of the number of resin foam particles directly welded to an adjacent resin foam particle without matrix resin therebetween is calculated. The same cutting, observation, and calculation are carried out at least at three different positions of the midsole 3, and the percentages of the numbers of directly welded resin foam particles respectively calculated for these positions are averaged. In the resin composite of the present invention, the average of the percentages of the numbers thus obtained is less than 10%.

In the shoe 1 of this embodiment, the midsole 3 is formed of the resin composite, but the outer sole 4 instead of the midsole 3 may be formed of the resin composite, or both the midsole 3 and the outer sole 4 may be formed of the resin composite. The midsole 3 or the outer sole 4 may be partially formed of the resin composite.

(Elastic body matrix)

The resin composite of this embodiment has an elastic body composed of an elastomer as a matrix (an elastic body matrix). In this description, the elastic body composed of an elastomer generally includes 10% or more (weight ratio) of the resin component relative to the component constituting the elastomer.

The resin component may be a thermoplastic resin or may be a thermosetting resin. In the case where the resin component is a thermoplastic resin, it has an advantage of being easily molded. In the case where the resin component is a thermosetting resin, it has an advantage of being excellent in heat resistance, chemical resistance, and mechanical strength.

The thermoplastic resin is not particularly limited, but for example a polystyrene-based resin, a polyolefin-based resin, or a thermoplastic polyurethane-based resin may be used. In the case where the thermoplastic resin is a polystyrene-based resin, the polystyrene-based resin may be, for example, a styrene-ethylene-butylene-styrene block copolymer (SEBS), a styrene-butadiene-butylene-styrene block copolymer (SBBS), a hydrogenated polystyrene-poly(styrene-butadiene)-polystyrene (SSEBS), a styrene-butylene-styrene block copolymer (SBS), a styrene-isoprene block copolymer (SIS), a styrene-ethylene-propylene-styrene block copolymer (SEPS), or the like, and SEBS, SSEBS, or SIS is more preferable. In the case where the thermoplastic resin is a polyolefin-based resin, the polyolefin-based resin may be, for example, low density polyethylene, medium density polyethylene, ethylene-alpha olefin copolymer, ethylene-propylene rubber, polypropylene, ethylene-vinyl acetate, ethylene-acrylic acid copolymer, or the like, and an elastomer including an ethylene crystal phase as a hard segment is preferable. More specifically, the polyolefin-based resin is preferably an elastomer constituted by polymer chains each of which has an ethylene crystal phase(s) at one end or both ends thereof, or a block copolymer having ethylene crystal phases and ethylene-alpha olefin copolymerized portions arranged alternately. In the case where the thermoplastic resin is a thermoplastic polyurethane-based resin, the thermoplastic polyurethane-based resin may be, for example, polyether-based polyurethane, polyester-based polyurethane, or the like, and polyether-based polyurethane is more preferable.

The thermosetting resin is not particularly limited, but preferably a thermosetting polyurethane-based elastomer, an acrylic elastomer, crosslinked rubber, a silicone-based elastomer, and a fluorine-based elastomer, and a urethane-based elastomer is particularly preferable.

These resin components may be individually used, or two or more of them may be used in combination.

As the resin component, a polystyrene-based elastomer is preferably selected. In this case, the initial elastic modulus of the elastomer can be adjusted to an appropriate value by appropriately adjusting the content of the styrene component (styrene content) in the polystyrene-based elastomer. Thereby, the initial stiffness and the amount of strain of the shoe sole member can be adjusted to appropriate values.

The elastomer may further include a plasticizer. In this case, the elastomer may be a polymeric gel in which the resin included therein is gelled. The plasticizer may be, for example, paraffinic, naphthenic, aromatic, olefinic, or the like, with paraffinic being more preferred. In the case where the elastomer includes a plasticizer, the content of the plasticizer included in the elastomeric resin component is preferably 10 to 300% by weight of the entire elastomeric resin component.

As the elastomer, it is preferable to use an elastomer including a resin component that is highly weldable with the plurality of foamed resin particles dispersed in the elastic body matrix. In this case, the elastic body matrix and the foamed resin particles can firmly adhere to each other without the use of adhesive elements such as binders.

For example, in the case where the foamed resin particles are composed of a polyolefin-based resin, the elastomer may be a polyolefin-based elastomer or a polystyrene-based elastomer. In the case where the foamed resin particles are composed of a polyurethane-based resin, the elastomer may also be a polyurethane-based elastomer.

In the case where the resin component is a thermoplastic resin, it is preferable that the elastomer have sufficient fluidity at temperatures lower than the melting point (melting peak) of the resin composition constituting the plurality of foamed resin particles. In this case, the plurality of resin foam particles can be easily dispersed in the elastic body matrix at the time of producing the resin composite. For example, the elastomer preferably has a complex viscosity of 0.1 MPa·s or less at temperatures lower than the melting point of the resin composition constituting the plurality of foamed resin particles. In the case where the thermoplastic resin is a polystyrene-based elastomer, it is preferable that the complex viscosity of the polystyrene-based elastomer at 100° C. be 0.05 MPa·s or less.

In this description, the complex viscosity of an elastomer refers to a value obtained by measurement at a frequency of 10 Hz in the measurement mode of the "tensile mode of a sinusoidal strain", based on JIS K 7244-4:1999. For example, the complex viscosity of an elastomer can be measured using "Rheogel-E4000", a dynamic viscoelasticity measurement instrument manufactured by UBM as a measurement instrument, under the following conditions:

Measurement mode: Tensile mode of a sinusoidal strain
Frequency: 10 Hz
Distance between chucks: 20 mm
Load: Automatic static load
Dynamic strain: 5 µm
Heating rate: 2° C./min
Test piece: Strip shape having a length of 33±3 mm, a width of 5±1 mm, and a thickness of 2±1 mm The elastomer may include any other component, and may further include chemicals such as pigments, antioxidants, and ultraviolet absorbers.

The initial elastic modulus of the elastomer is not particularly limited, but the initial elastic modulus at 23° C. may preferably be 0.1 MPa or more and 5 MPa or less, more preferably be 0.2 MPa or more and 3 MPa or less, further preferably be 3 MPa or less. In this case, the initial stiffness and the amount of strain of the resin composite can be set to values more suitable for the shoe sole member. When the initial elastic modulus of the elastomer at 23° C. is less than 0.1 MPa, the shoe sole member including the elastomer may have insufficient durability and mechanical strength. In this description, the elastic modulus (Young's modulus) of an elastomer means a compressive elastic modulus at 23° C. Measurement of the compressive elastic modulus of an elastomer can be performed, for example, by the method described in the Examples to be described later. As the value of the elastic modulus of an elastomer, the value of storage modulus at 23° C. as measured by the method according to JIS K 7244-4:1999 as abovementioned may also be used.

The elastic body matrix is a non-foam product. Thus, the elastic body matrix can have a relatively high density. As a result, the resin composite can effectively exhibit its characteristics that it has a small amount of strain at a high load. In addition, use of the non-foamed elastic body matrix also brings an advantage that, at the time of molding the resin composite, which will be described later, deformation of the molded products caused by shrinkage of the resin foam particles, which may occur when a plurality of materials with different degrees of foaming are mixed and hot-pressed, does not occur.

(Resin Foam Particles)

The resin composite of this embodiment has a plurality of resin foam particles dispersed in the non-foamed elastic body matrix.

The plurality of resin foam particles may be composed of any resin composition capable of being made into resin foam particles. For example, the resin composition may be a polyolefin such as polyethylene (PE) or polypropylene (PP), thermoplastic polyurethane (TPU), polystyrene (PS), ethylene-propylene rubber (EPDM), polyether block amide (PEBA), polyesters (PEs), vinyl ethylene acetate (EVA), or polyamide (PA). Preferably, the resin composition may be a polyolefin-based resin, a polyurethane-based resin, or a polystyrene-based resin, and for example the aforementioned polyolefin-based resin or polyurethane-based resin, which can be used as a resin component included in the elastomer, can be used. These resin compositions may be individually used, or two or more of them may be used in combination.

As a resin composition constituting the plurality of resin foam particles, it is preferable to use a resin that is highly weldable to the resin component included in the elastomer constituting the elastic body. In this case, the elastic body matrix and the foamed resin particles can firmly adhere to each other without the use of adhesive elements such as binders. For example, in the case where the resin component included in the elastomer is a polyolefin-based elastomer or a polystyrene-based elastomer, the resin composition constituting the foamed resin particles is preferably a polyolefin-based resin. In the case where the resin component included in the elastomer is a polyurethane-based elastomer, the resin composition constituting the foamed resin particles is also preferably a polyurethane-based resin.

In the case where the resin component included in the elastomer is a thermoplastic resin, it is preferable that the melting point of the resin composition constituting the plurality of foamed resin particles be higher than the temperature at which the elastomer is capable of having sufficient fluidity. In this case, the plurality of resin foam particles can be easily dispersed in the elastic body matrix at the time of producing the resin composite. The melting point of the resin composition constituting the plurality of foamed resin particles may be preferably 100° C. to 180° C.

The elastic modulus of the resin composition is not particularly limited, but for example, the initial elastic modulus at 23° C. may be 10 MPa or more and 400 MPa or less. The elastic modulus can be measured in a similar manner to that of the elastic modulus of the elastic body.

The resin composition may include any other component, and may further include chemicals such as pigments, antioxidants, and ultraviolet absorbers.

The plurality of resin foam particles can be made from the resin composition using a conventionally known method. Specifically, the foamed resin particles constituting the resin foamed particles may be made by, for example, an impregnation method in which resin particles free from foaming agents are made, followed by impregnation of the resin particles with a foaming agent, or an extrusion method in which a resin composition including a foaming agent is extruded into cooling water for granulation. In the impregnation method, the resin composition is first molded to make resin particles. Next, the resin particles, a foaming agent, and an aqueous dispersant are introduced into an autoclave, followed by stirring under heat and pressure, to impregnate the resin particles with the foaming agent. The foaming agent with which the resin particles are impregnated is caused to foam to obtain the foamed resin particles. In the extrusion method, for example, the resin composition and a foaming agent are added into an extruder equipped with a die having many small holes at its end, followed by melt-kneading. The molten-kneaded product is extruded from the die into the form of strands and thereafter is immediately introduced into cooling water to be cured. The thus obtained cured material is cut into a specific length to obtain the foamed resin particles.

The foaming agent used in the aforementioned methods is not particularly limited and may be, for example, a chemical foaming agent or a physical foaming agent. The chemical foaming agent is a foaming agent that generates a gas by chemical reaction or thermal decomposition. Examples of the chemical foaming agent include inorganic chemical foaming agents such as sodium bicarbonate and ammonium carbonate, and organic chemical foaming agents such as azodicarbonamide. The physical foaming agent is, for example, a liquefied gas or a supercritical fluid, and is foamed by pressure reduction or heating. Examples of the physical foaming agent include aliphatic hydrocarbons such as butane, alicyclic hydrocarbons such as cyclobutane, and inorganic gases such as carbon dioxide gas, nitrogen, and air.

In this embodiment, in order to make the foamed resin particles, an impregnation method using a supercritical fluid for foaming the resin composition is particularly preferably used. In this case, the resin composition can be dissolved in the supercritical fluid at a comparatively low temperature, and therefore the need for a high temperature for melting the resin composition is eliminated. This is particularly advantageous when the resin composition includes a resin with a high melting point, such as a polyamide elastomer. Further, the method is advantageous also in that generation of toxic gases due to foaming of a chemical foaming agent is suppressed since no chemical foaming agent is used.

The density and the expansion ratio of the plurality of resin foam particles are not particularly limited.

The shape and the size of the plurality of resin foam particles are not particularly limited. The shape of the resin foam particles is preferably spherical. In this case, the volume-average particle size D50 (median diameter) of the resin foam particles may be preferably in a diameter range of 1 to 20 mm, more preferably in a diameter range of 2 to 10 mm. In this description, the particle size of the resin particles means a value obtained by measuring the long diameter of the particles using a microscope.

The initial elastic modulus of the foamed particles is not particularly limited, but the initial elastic modulus of the foamed particles at 23° C. may preferably be 0.2 MPa or more and 20 MPa or less, more preferably be 0.3 MPa or more and 10 MPa or less. In this case, the initial stiffness and the amount of strain of the resin composite can be set to values more suitable for the shoe sole member. The initial elastic modulus of the foamed particles included in the resin composite can be measured by, for example, the method described in Examples below.

(Resin Composite)

The resin composite of this embodiment is formed with the plurality of resin foam particles dispersed in the non-foamed elastic body matrix. With this configuration, the shoe sole member of this embodiment is advantageous in that it is light in weight but can exhibit soft wearing feeling when the foot fits in the shoe, suppress excessive deformation, and exhibit cushioning properties, and is excellent in durability, as compared with a conventional shoe sole member.

The resin composite is obtained, for example, by preliminarily kneading the plurality of resin foam particles and the elastic body together using an open roll, mixer, or the like to obtain a preliminarily kneaded resin material in which the plurality of resin foam particles are dispersed in the elastic body matrix, followed by introducing the preliminarily kneaded resin material into a foaming mold, and thereafter hot-pressing the material in the foaming mold using a heat press machine. By using such a method, the resin composite in which the plurality of resin foam particles are dispersed in the elastic body matrix can be produced.

The elastic body can preferably be formed into particles by a conventionally known method, and then mixed with the plurality of resin foam particles. The shape and the size of the elastic body formed into particles are not particularly limited. The method for mixing the elastic body with the plurality of resin foam particles is not particularly limited, and the elastic body can be mixed with the plurality of resin foam particles by any method.

The temperature for the hot-pressing is appropriately adjusted depending on the type of the resin composition constituting the plurality of resin foam particles and the type of the resin composition constituting the elastic body. For example, in the case where the resin foam particles are composed of a polyolefin-based resin and the elastic body is composed of a polyolefin-based elastomer, the plurality of resin foam particles with which the elastic body is mixed can be hot-pressed appropriately under pressure at a temperature within the range of 80 to 160° C.

Alternatively, in the case where the resin component included in the elastomer is a thermoplastic resin, the resin composite is obtained also by simply mixing together the plurality of resin foam particles and the elastic body both formed as aforementioned without having the elastic body molten, followed by introducing the mixture into a forming mold, and then hot-pressing the mixture in the forming mold using a heat press machine while heating to transfer heat in the entire heat pressing machine. By using this method, and by using a heat pressing machine having the shape of a desired shoe sole member, a shoe sole member formed of the resin composite can be produced in a single step.

The resin composite may be configured such that a binder is provided on the surfaces of the plurality of resin foam particles, and the elastic body matrix and the plurality of resin foam particles adhere to each other via the binder. In this case, the plurality of resin foam particles and the elastic body can firmly adhere to each other even in the case of low weldability between the resin composition constituting the plurality of resin foam particles and the resin component included in the elastic body. Examples of the binder include binders such as surface modifiers, polyolefin, or polyurethane. Here, polyolefin and polyurethane may be, for example, a polyolefin resin and a polyurethane resin that can be used as a material of the aforementioned elastic body matrix. These binders may be individually used, or two or more of them may be used in combination.

Preferably, the binder may be provided on the surfaces of the plurality of resin foam particles by any method, before the plurality of resin foam particles and the elastic body are mixed together. The method may include, for example, preliminary kneading of the plurality of resin foam particles and the binder using an open roll, a mixer, or the like.

In this embodiment, various resin composites having a wide range of physical properties can be obtained by appropriately adjusting the mixing ratio between the plurality of resin foam particles and the elastic body both included in the resin composite, depending on the required initial stiffness and amount of strain. For example, the amount of the elastic body included in the resin composite may be 5 to 90% (volume ratio) based on the entire resin composite. In this case, the weight of the resin composite can be appropriately reduced and the elastic recovery of the resin composite can be appropriately increased.

Alternatively, the resin composite may be made by adjusting the mixing ratio between the plurality of resin foam particles and the elastic body depending on the required initial stiffness and amount of strain independently for every given area before dispersing the plurality of resin foam particles in the elastic body matrix, and thereafter dispersing the plurality of resin foam particles in the elastic body. For example, in the case where the method in which the aforementioned mixture of the plurality of resin foam particles and the elastic body is hot-pressed is used, the mixing ratio of the elastic body in areas of the shoe sole member that are likely to be subjected to a relatively large load, specifically, areas of a heel portion and a forefoot portion, may be higher than the mixing ratio of the resin composition in other areas. The heel portion of the shoe sole member having a large mixing ratio of the elastic body can effectively exhibit the shock absorbing effect due to the characteristics of the elastic body even in the case where the heel portion is subjected to a relatively large load when the wearer lands in the motion of various sports. In addition, the forefoot portion of the shoe sole member having a large mixing ratio of the elastic body suppresses excessive deformation of the shoe sole and thereby enables the wearer to smoothly transfer his or her body weight at the time of the wearer's cutting maneuvers. On the other hand, in an area of the shoe sole member that is less likely to be subjected to a relatively large load, the mixing ratio of the elastic body may be made smaller than the mixing ratio of the resin composition in other areas. For example, the midfoot portion of the shoe sole member, which is less likely to be subjected to a large load, may have a certain degree of cushioning properties. Thus, the area of the midfoot portion may have a small mixing ratio of the elastic body, thereby making it possible to reduce the weight of the shoe sole member. As described above, the mixing ratio between the plurality of resin foam particles and the elastic body is adjusted independently for every given area, so that the resin composite of which the initial stiffness and the amount of strain are different for every given area can be formed.

The resin composite of this embodiment has a relatively small initial stiffness, a relatively large amount of strain during normal use, and a small amount of strain at a high load. The initial stiffness and the amount of strain can be determined from a compressive stress-strain curve based on the method described in Examples below. The initial elastic modulus of the resin composite at 23° C. is preferably not more than 10 MPa, more preferably not more than 5 MPa.

The resin composite of this embodiment includes the non-foamed elastic body composed of an elastomer as a matrix, and thus has a smaller permanent compression set than that of a foamed body used for a conventional shoe sole member. Therefore, the shoe sole member of this embodiment formed of the resin composite has also an advantage of being excellent in elastic recovery.

(Shoe Sole Member and Shoe)

The shoe sole members of this embodiment, and the shoes including the shoe sole members can be produced in the same manner as conventionally known methods for producing shoes.

For example, a method for producing shoe sole members including the shoe sole members of this embodiment includes the following steps:
(a) a first step of producing each of the plurality of resin foam particles from the first resin composition by the abovementioned impregnation method, extrusion method, or the like;
(b) a second step of preliminarily kneading the plurality of resin foam particles obtained in the first step and the elastic body using an open roll, mixer, or the like;
(c) a third step of introducing the preliminarily kneaded material into a forming mold, followed by hot-pressing the forming mold using a heat press machine, to obtain a resin composite in which the plurality of resin foam particles are dispersed in the elastic body matrix; and
(d) a fourth step of producing shoe sole members that are partially or entirely formed of the resin composite obtained in the third step.

In this production method, a preliminarily kneaded material in which the plurality of resin foam particles are dispersed in an elastic body matrix formed of the elastic body is produced by the preliminary kneading in the second step. The preliminarily kneaded material is molded into a resin composite having a desired shape in the subsequent third step.

Alternatively, another method for producing shoe sole members including the shoe sole members of this embodiment includes the following steps:
(a) a first step of producing each of the plurality of resin foam particles from the first resin composition by the abovementioned impregnation method, extrusion method, or the like;
(b) a second step of mixing the elastic body with the plurality of resin foam particles obtained in the first step;
(c) a third step of introducing the mixture into a forming mold, followed by hot-pressing the forming mold using a heat press machine while heating the heat press machine to transfer heat thoroughly thereinto, to obtain a resin composite in which the plurality of resin foam particles are dispersed in the elastic body matrix; and
(d) a fourth step of producing shoe sole members that are partially or entirely formed of the resin composite obtained in the third step.

In this production method, the elastic body in the mixture is molten into a matrix form by heating the heat press machine to transfer heat thoroughly thereinto in the third step, to form a resin composite in which the plurality of resin foam particles are dispersed in the elastic body matrix.

Each of these production methods may further include a step of providing a binder on the surfaces of the plurality of resin foam particles using an open roll, mixer, or the like, after the first step but before the second step.

In each of the third steps of these production methods, the shoe sole member may be directly molded into a certain shape by hot-pressing using a forming mold. In this case, shoe sole members that are entirely formed of the resin composite can be directly produced, and therefore the fourth step can be omitted.

As described above, the shoe sole member of this embodiment is partially or entirely formed of a resin composite including a non-foamed elastic body matrix composed of an elastomer, and a plurality of resin foam particles dispersed in the elastic body matrix, and thus has a relatively small initial stiffness, a relatively large amount of strain during normal use, a relatively small amount of strain at a high load, and a relatively high elastic recovery. Therefore, the shoe including the shoe sole member exhibits soft wearing feeling when the foot fits in the shoe, can exhibit high cushioning properties while suppressing excessive deformation, and is excellent in durability. In addition, the shoe of this embodiment, which includes the shoe sole member, exhibits soft wearing feeling when the foot fits in the shoe, and can exhibit high cushioning properties and high durability while suppressing excessive deformation.

Although detailed description beyond the above will not be repeated here, conventionally known technical matters on shoe sole members may be optionally employed in the present invention even if the matters are not directly described in the above.

EXAMPLES

Hereinafter, the present invention will be elucidated by way of specific examples and comparative examples of the present invention. However, the present invention is not limited to the following examples.
(Elastic Body Matrix Material)

Various styrene-based resins and paraffin oil (density of 0.88 g/cm$^3$) as a plasticizer were mixed at 120 to 200° C. using a commercially available twin-screw extruding kneader to produce gel-like styrene-based elastomer materials 1 to 3 (GELs 1 to 3) respectively having different elastic moduli.
(Resin Foam Particles)

Polyolefin-based resins were used as the raw materials of foaming particles, to produce three kinds of resin foam particles 1 to 3 (foams 1 to 3, D50= . . . mm) having different degrees of foaming using a conventionally known method.
(Production of Resin Composite)

Examples 1 to 5

First, as materials used for in the following production method, each of the kinds of elastic body matrix materials shown in Table 1 below, resin foam particles, and a polyolefin-based resin including paraffin oil as a binder were prepared so that each of the elastic body matrix materials: resin foam particles:binder is 32:10:58 (volume ratio).

The resin foam particles and the binder were kneaded together using a commercially available two-roll kneader to obtain resin foam particles having surfaces to which the binder was almost entirely attached.

The resulting resin foam particles to which the binder was attached and the elastic body matrix material were kneaded together at 110° C. using a commercially available two-roll kneader to allow the elastic body matrix material to melt and form the elastic body matrix, as well as causing the resin foam particles to be dispersed in the elastic body matrix. Thereafter, the kneaded product was cooled to room temperature.

Subsequently, cavities of a foaming mold were filled with the kneaded product (in so doing, the kneaded product may be cut off, as appropriate, to allow the cavities to be filled with the kneaded product), and the forming mold was heated for two minutes under pressure by a heat press machine, followed by cooling with cold water for 10 minutes, to obtain a resin composite. The obtained resin composite had the resin foam particles dispersed in an elastic body matrix in which the elastic body matrix material was a continuous body as a whole. At this time, the elastic body matrix or the binder lied between each adjacent resin foam particles as a whole, and few portions at which the resin foam particles were directly welded to each other were present.

Comparative Examples 1 and 2

Cavities of a forming mold were filled only with each of the kinds of elastic body matrix shown in Table 1 below, and the forming mold was heated for two minutes under pressure by a heat press machine, followed by cooling with cold water for 10 minutes, to obtain a resin composite composed solely of an elastic body.

Comparative Example 3

A polymer alloy composed of an olefin resin and EVA (ethylene-vinyl acetate copolymer resin) was crosslinked and foamed by a conventionally known method to obtain a plate-shaped resin molded product composed of a crosslinked foamed product.
(Physical Property Test of Styrene-Based Elastomer Materials)

The initial elastic modulus $E_0$ of each of the styrene-based elastomer materials 1 to 3 was calculated, using a stress-strain curve obtained by cutting each of the styrene-based elastomer materials into a cylindrical shape having a diameter of 29 mm and a height of 12 mm and compressing the sample piece using an autograph precision universal tester (product name "AG-50kNIS MS" manufactured by Shimadzu Corporation) at 23° C. and at a strain rate of 0.1 mm/sec. The results are shown in Table 1 below.

TABLE 1

| Styrene-based elastomer material | $E_0$ (MPa) |
| --- | --- |
| GEL 1 | 0.37 |
| GEL 2 | 0.56 |
| GEL 3 | 0.90 |

(Physical Property Test of Foamed Particles)

The volume-average particle size D50 of each kind of foamed resin particles was measured using a microscope. The density of each kind of foamed resin particles was calculated from the test piece weight and test piece volume. The results are shown in Table 2 below. The initial modulus $E_0$ of each kind of foamed resin particles at 23° C. was measured as follows. Specifically, the above kinds of foamed resin particles were respectively hot-pressed for integration to produce a plurality of plate-shaped molded products having different specific gravities. The initial elastic modulus of each of the plurality of plate-shaped molded products, was measured by the abovementioned method to make an approximate line between the specific gravity and initial modulus of the plate-shaped molded product. Based on this approximate line, the initial elastic modulus $E_0$ of the foamed resin particles was estimated from the specific gravity of the foamed resin particles. The results are shown in Table 2 below.

TABLE 2

| Foamed particles | D50 (mm) | Density (g/cm³) | $E_0$ (MPa) |
|---|---|---|---|
| Foam 1 | 4.1 | 0.165 | 0.84 |
| Foam 2 | 3.9 | 0.195 | 0.99 |
| Foam 3 | 3.6 | 0.232 | 1.18 |

(Physical Property Test of Shoe Sole Member)
Preparation of Test Piece

Figure 3:
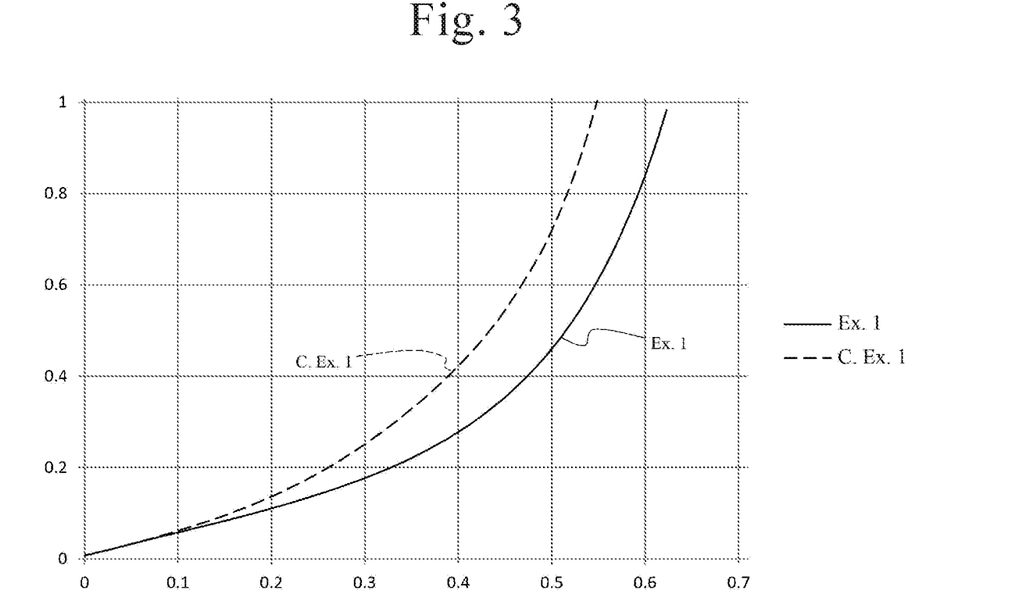
FIG. 3 is a graph showing the compressive stress-strain curves of an Example and a Comparative Example.
Figure 4:
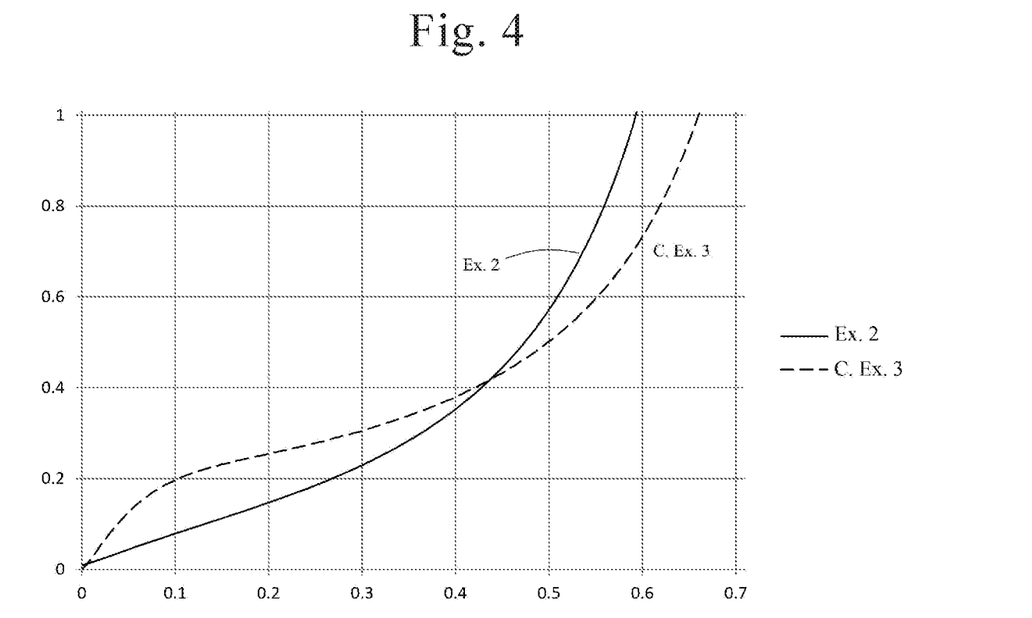
FIG. 4 is a graph showing the compressive stress-strain curves of an Example and a Comparative Example.
Figure 5:
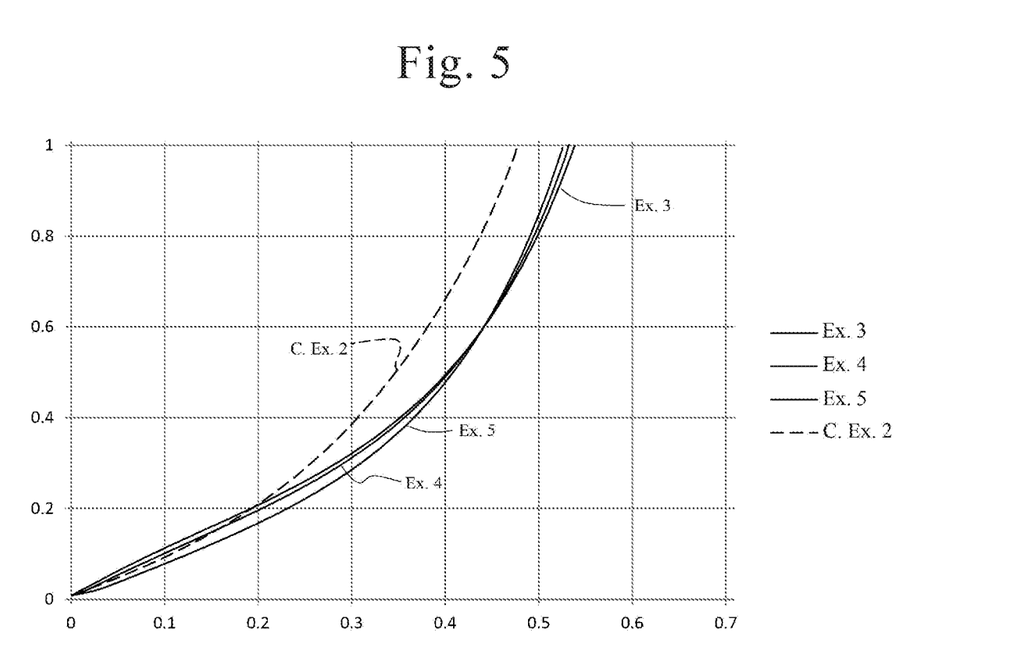
FIG. 5 is a graph showing the compressive stress-strain curves of Examples and a Comparative Example.

The resin composites of Examples 1 to 5 and the resin molded products of Comparative Examples 1 to 3 were cut into a disc shape having a diameter of 29±1 mm and a thickness of 12±1 mm to obtain the respective test pieces.
Density Measurement The density of each of the test pieces of Examples 1 to 5 and Comparative Examples 1 to 3 was calculated from the test piece weight and the test piece volume. The results are shown in Table 3.
Measurement of Compressive Stress-Strain Curve The compressive stress-strain curves of the test pieces of Examples 1 to 5 and Comparative Examples 1 to 3 were respectively obtained by cutting the foam products into a cylindrical shape having a diameter of 29 mm and a height of 12 mm, and compressing the sample pieces using an autograph precision universal tester (product name "AG-50kNIS MS" manufactured by Shimadzu Corporation) at 23° C. and at a strain rate of 0.1 mm/sec. The compressive stress-strain curves thus measured are shown in FIGS. 3 to 5. The initial elastic moduli $E_0$ (MPa) at 23° C., the compressive stresses $\sigma_{0.4}$ (MPa) at a strain of 0.4, and the strains $\varepsilon_{1MPa}$ at a compressive stress of 1 MPa, of the test pieces of Examples 1 to 5 and Comparative Examples 1 to 3, which are obtained from the compressive stress-strain curves, are shown in Table 3.

TABLE 3

| | Styrene-based elastomer material | Foamed particles | | Resin composite/foam product | | | |
|---|---|---|---|---|---|---|---|
| | | Kind | Density (g/cm³) | Density (g/cm³) | $E_0$ (MPa) | $\sigma_{0.4}$ (MPa) | $\varepsilon_{1MPa}$ (-) |
| Ex. 1 | GEL 1 | Foam 1 | 0.165 | 0.54 | 0.50 | 0.28 | 0.62 |
| Ex. 2 | GEL 1 | Foam 2 | 0.195 | 0.57 | 0.70 | 0.36 | 0.59 |
| Ex. 3 | GEL 1 | Foam 3 | 0.232 | 0.59 | 1.00 | 0.50 | 0.53 |
| Ex. 4 | GEL 2 | Foam 2 | 0.195 | 0.57 | 0.95 | 0.50 | 0.53 |
| Ex. 5 | GEL 3 | Foam 1 | 0.165 | 0.55 | 0.83 | 0.49 | 0.53 |
| C. Ex. 1 | GEL 2 | — | | 0.90 | 0.56 | 0.43 | 0.55 |
| C. Ex. 2 | GEL 3 | — | | 0.90 | 0.90 | 0.67 | 0.48 |
| C. Ex. 3 | — | (Crosslinked foam product) | | 0.17 | 2.86 | 0.38 | 0.66 |

It is understood evidently from Table 1 and FIGS. 3 to 5 that the resin composites of Examples 1 to 5 each are extremely light in weight as compared with the resin molded products of Comparative Examples 1 and 2 composed solely of an elastic body. The resin composite of Example 1 has an equivalent initial stiffness $E_0$ but a small compressive stress $\sigma_{0.4}$ at a strain of 0.4, as compared with the resin molded product of Comparative Example 1 composed solely of an elastic body. Similarly, the resin composites of Examples 3 to 5 each have an equivalent initial stiffness $E_0$ to that of the resin molded product of Comparative Example 2 composed solely of an elastic body, but a smaller compressive stress $\sigma_{0.4}$ at a strain of 0.4 than that of Comparative Example 2. Thus, it is understood that the resin composites according to the Examples can each exhibit high cushioning properties as compared with the material solely of an elastic body having an equivalent flexibility.

Further, it is understood that the resin composites of Examples 1 to 5 each have an extremely small initial stiffness $E_0$ as compared with the resin molded product of Comparative Example 3 composed only of a crosslinked foam product. That is, it is understood that the resin composites according to the Examples each have a higher flexibility than the simple crosslinked foam product, and thereby exhibit soft wearing feeling when the foot fits into the shoe. In addition, the resin composites of Examples 1 to 5 each have a higher density (specific gravity) than the resin molded product of Comparative Example 3 composed only of the crosslinked foam product, and thereby have a relatively excellent durability. The resin composite of Example 2 has an equivalent compressive stress $\sigma_{0.4}$ but a small initial stiffness $E_0$ and a relatively small strain $\varepsilon_{1MPa}$ at a compressive stress of 1 MPa, as compared with the resin molded product of Comparative Example 3 composed only of a crosslinked foam product. Thus, it is understood that the resin composites according to the Examples each have a high flexibility and can suppress excessive deformation and resulting decrease in shape restoring force, as compared with the crosslinked foam product having equivalent cushioning properties.

Accordingly, it is understood that the shoe provided with the resin composites according to the Examples as a shoe sole member exhibits soft wearing feeling when the foot fits in the shoe, suppresses excessive deformation and resulting decrease in shape restoring force while having sufficient lightweight properties, and exhibits high durability and cushioning properties.

REFERENCE SIGNS LIST

1: Shoe
3: Midsole
4: Outer sole
31: Elastic body matrix
32: Resin foam particle

The invention claimed is:
1. A shoe sole member partially or entirely formed of a resin composite, the resin composite comprising:
   a non-foamed elastic body matrix composed of an elastomer; and
   a plurality of resin foam particles dispersed in the elastic body matrix, wherein less than 10% of the plurality of resin foam particles are in direct contact with another resin foam particle, and an average particle size D50 of the plurality of resin foam particles is 1 mm or more.

2. The shoe sole member according to claim 1, wherein the elastomer comprises a thermoplastic resin.

3. The shoe sole member according to claim 1, wherein the elastomer comprises a thermosetting resin.

4. The shoe sole member according to claim 1, wherein the elastomer comprises a polyolefin-based elastomer or a polystyrene-based elastomer, and the plurality of resin foam particles are constituted by a resin composition comprising a polyolefin-based resin.

5. The shoe sole member according to claim 1, wherein the elastomer comprises a polyurethane-based elastomer, and the plurality of resin foam particles are constituted by a resin composition comprising a polyurethane-based resin.

6. The shoe sole member according to claim 1, wherein the elastic body matrix has an initial elastic modulus at 23° C. being smaller than an initial elastic modulus at 23° C. of the plurality of resin foam particles.

7. The shoe sole member according to claim 1, wherein the elastic body matrix and the plurality of resin foam particles adhere to each other via a binder.

8. A shoe comprising the shoe sole member according to claim 1.

9. A shoe comprising the shoe sole member according to claim 2.

10. A shoe comprising the shoe sole member according to claim 3.

11. A shoe comprising the shoe sole member according to claim 4.

12. A shoe comprising the shoe sole member according to claim 5.

13. A shoe comprising the shoe sole member according to claim 6.

14. A shoe comprising the shoe sole member according to claim 7.

* * * * *